United States Patent
Seroff et al.

(10) Patent No.: US 9,164,680 B2
(45) Date of Patent: *Oct. 20, 2015

(54) SYSTEMS AND METHODS FOR IMPROVED COMMUNICATIONS IN A NONVOLATILE MEMORY SYSTEM

(71) Applicant: Apple Inc., Cupertino, CA (US)

(72) Inventors: Nicholas C. Seroff, Los Gatos, CA (US); Anthony Fai, Palo Alto, CA (US); Nir Jacob Wakrat, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/147,700

(22) Filed: Jan. 6, 2014

(65) Prior Publication Data

US 2014/0164717 A1    Jun. 12, 2014

Related U.S. Application Data

(63) Continuation of application No. 13/308,414, filed on Nov. 30, 2011, now Pat. No. 8,626,994.

(51) Int. Cl.
| | |
|---|---|
| *G06F 13/00* | (2006.01) |
| *G06F 13/28* | (2006.01) |
| *G06F 3/06* | (2006.01) |
| *G06F 12/02* | (2006.01) |
| *G06F 13/16* | (2006.01) |

(52) U.S. Cl.
CPC .............. *G06F 3/0611* (2013.01); *G06F 3/061* (2013.01); *G06F 3/0625* (2013.01); *G06F 3/0634* (2013.01); *G06F 3/0635* (2013.01); *G06F 3/0679* (2013.01); *G06F 3/0688* (2013.01); *G06F 12/0246* (2013.01); *G06F 13/1684* (2013.01); *G06F 2212/7204* (2013.01); *Y02B 60/1246* (2013.01)

(58) Field of Classification Search
CPC ... G06F 3/0611; G06F 3/0625; G06F 3/0688; G06F 3/0634; G06F 3/0635; G06F 13/1684
See application file for complete search history.

(56) References Cited

U.S. PATENT DOCUMENTS

| | | | |
|---|---|---|---|
| 8,281,067 B2 | 10/2012 | Stolowitz | |
| 8,626,994 B2 * | 1/2014 | Seroff et al. | 711/103 |
| 2005/0027920 A1 * | 2/2005 | Fitzsimmons et al. | 710/317 |
| 2005/0091432 A1 | 4/2005 | Adams | |
| 2008/0140945 A1 | 6/2008 | Salessi | |
| 2009/0083457 A1 | 3/2009 | Kim | |
| 2011/0296124 A1 | 12/2011 | Fredenberg | |
| 2012/0306902 A1 | 12/2012 | MacWilliams | |
| 2013/0159611 A1 | 6/2013 | Nasiby | |

* cited by examiner

*Primary Examiner* — Edward Dudek, Jr.
(74) *Attorney, Agent, or Firm* — Meyertons, Hood, Kivlin, Kowert & Goetzel, P.C.

(57) ABSTRACT

Systems and methods are provided for improved communications in a nonvolatile memory ("NVM") system. The system can toggle between multiple communications channels to provide point-to-point communications between a host device and NVM dies included in the system. The host device can toggle between multiple communications channels that extend to one or more memory controllers of the system, and the memory controllers can toggle between multiple communications channels that extend to the NVM dies. Power islands may be incorporated into the system to electrically isolate system components associated with inactive communications channels.

20 Claims, 8 Drawing Sheets

US 9,164,680 B2

SYSTEMS AND METHODS FOR IMPROVED COMMUNICATIONS IN A NONVOLATILE MEMORY SYSTEM

PRIORITY OF CLAIM

This application is a continuation of U.S. application Ser. No. 13/308,414, filed Nov. 30, 2011.

FIELD OF THE INVENTION

This document relates to systems and methods for improved communications in nonvolatile memory systems.

BACKGROUND

Various types of nonvolatile memory ("NVM"), such as flash memory (e.g., NAND flash memory and NOR flash memory), can be used for mass storage. For example, consumer electronics (e.g., portable media players) use flash memory to store data, including music, videos, images, and other media or types of information.

Memory controllers can be used to perform access requests (e.g., program, read, erase operations) and memory management functions on NVM. In typical nonvolatile memory systems, a single memory controller can access multiple units of NVM, such as multiple memory dies (e.g., NAND flash memory dies), over a shared bus. Memory controllers can also communicate with a host device through an interface and over a communications channel (e.g., a bus). Typical shared bus communication systems can suffer from signal integrity problems, especially as the number of elements connected by the bus increases.

SUMMARY

Systems and methods for improved communications in a nonvolatile memory system are disclosed. A nonvolatile memory system may include a host device, one or more memory controllers, and one or more memory dies. A "hot device" can be a board-level device that can include one or more host controllers (e.g., processor (s) microprocessor(s)) that are configured to manage operation of the host device. Memory packages can be self-contained physical entities that include nonvolatile memory (e.g., one or more memory dies) and memory controllers to perform memory operations on the nonvolatile memory (e.g., read, program, and erase operations). A memory package can include a substrate that is separate from and coupled to a board-level device.

Communication between different elements of a nonvolatile memory system can be effected using point-to-point communications channels. According to some embodiments, point-to-point communication between elements of an NVM system can utilize a number of external communications channels extending from a host device to each memory controller. External communications channels can communicate with memory controllers, for example, through external interfaces included in each memory package. An NVM system can also include internal communications channels extending from each memory controller to each memory die. Switches (e.g., a multiplexer ("MUX")) located throughout an NVM system can toggle between the multiple external and internal communications channels to achieve point-to-point communication between a host and one or more memory dies.

In some embodiments, memory controllers may adjust the number of active external interfaces to optimize point-to-point communication between the host and the memory dies. The adjustment may be based on a number of factors, such as, for example, the speed of the host device, the speed of the memory controllers, the speed of the external interfaces, and/or or the number of available external interfaces. An NVM system may also utilize power islands in the NVM packages to electrically isolate inactive system elements. Power islands can save power and help to simplify communication between the host and the one or more memory dies.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION

Figure 1:
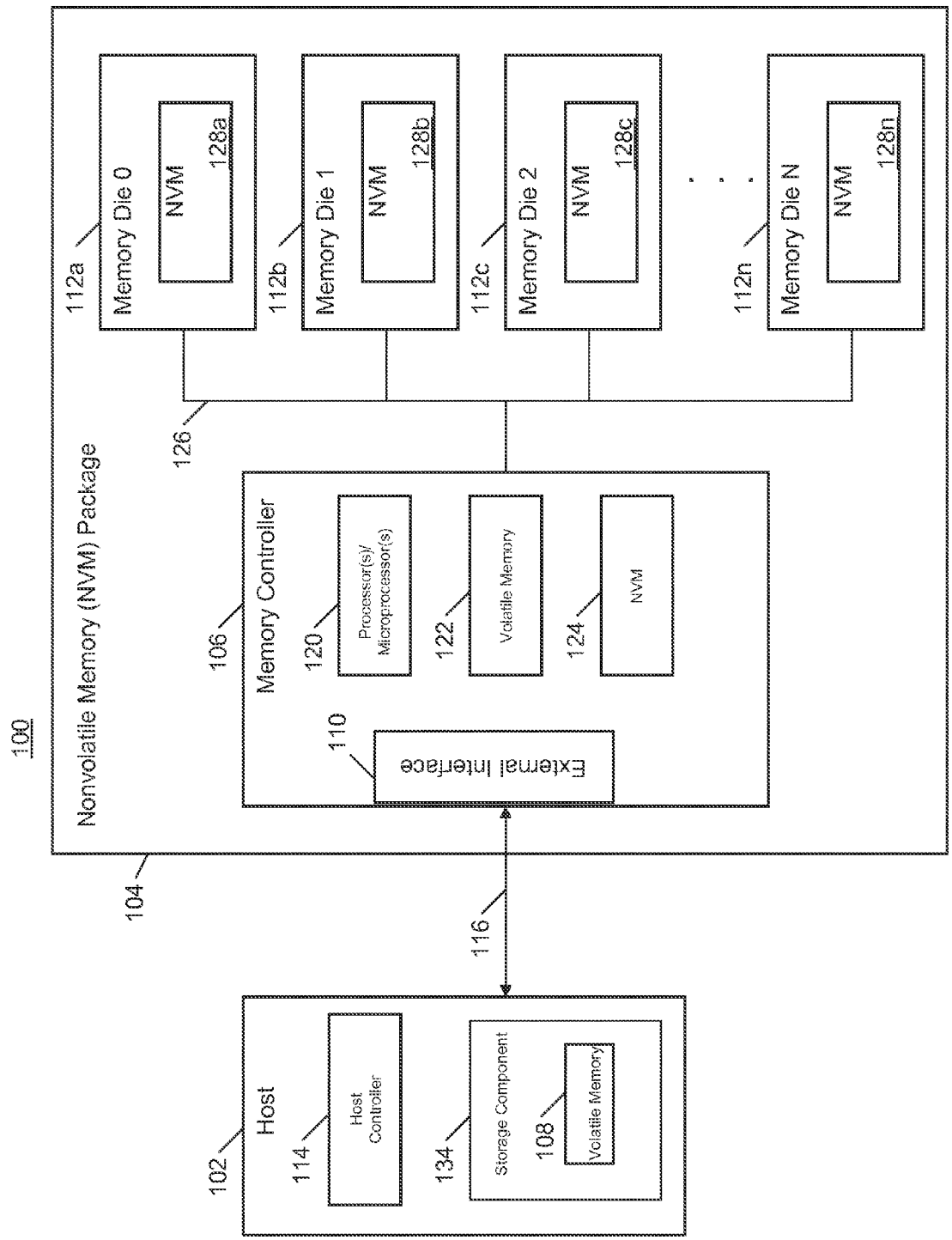
FIG. 1 is a diagram depicting an illustrative system that includes a host and an NVM package with a memory controller in accordance with some embodiments of the invention.

FIG. 1 is a diagram depicting system 100, including host 102, which may be configured to communicate with NVM package 104. NVM package 104 can include memory controller 106, and memory dies 112a-n with corresponding. NVMs 128a-n. As depicted in the illustrative system 100, host 102 can communicate with NVM package 104 over communications path 116, which may include one or more external communications channels. According to embodiments in which communications path 116 includes more than one external communications channel, host 102 can toggle between the available external communications channels to help achieve point-to-point communication with a particular portion of NVMs 128a-n. Systems having multiple external communications channels are described in more detail in connection with FIGS. 2-7.

As used herein, a "channel" can refer to a single communications path between two system components (e.g., host 102 and NVM package 104). A "bus" can refer to a communications path that branches one or more times to communicatively couple together multiple system components.

Host 102 can be any of a variety of host devices and/or systems, such as a portable media player, a cellular telephone, a pocket-sized personal computer, a personal digital assistant ("PDA"), a desktop computer, a laptop computer, and/or a tablet computing device. NVM package 104 can include NVMs 120a-n (e.g., in the memory dies 112a-n) and can be a ball grid array package or other suitable type of integrated circuit ("IC") package. NVM package 104 may be part of and/or separate from host 102. For example, host 102 can be a board-level device and NVM package 104 can be a memory package that is installed on the board-level device. In other embodiments, NVM package 104 can be coupled to host 102 with a wired (e.g., SATA) or wireless (e.g., Bluetooth™) interface.

Host 102 can include host controller 114 that is configured to interact with NVM package 104. For example, host 102 can transmit various access requests, such as read, program, and erase requests, to NVM package 104. Host controller 114 can also include one or more processors and/or microprocessors that are configured to perform operations based on the execution of software and/or firmware instructions. Additionally and/or alternatively, host controller 114 can include hardware-based components, such as application-specific integrated circuits (ASICs), that are configured to perform various operations. Host controller 114 can format information (e.g., access requests and/or data) transmitted to NVM package 104 according to a communications protocol shared between host 102 and NVM package 104.

Host 102 may also include storage component 134, including volatile memory 108. Volatile memory 108 can be any of a variety of volatile memory types such as, for example, cache memory or RAM. Host device 102 can use volatile memory 108 to perform access requests and/or to temporarily store data that is being read from and/or programmed to NVM package 104. For example, volatile memory 108 can temporarily store a queue of memory operations to be sent to, or to store data received from, NVM package 104.

Host 102 can communicate with NVM package 104 over communications path 116, which may be fixed, detachable (e.g., universal serial bus (USB), serial advanced technology (SATA), etc.), or wireless (e.g., Bluetooth™). Interactions with NVM package 104 can include transmitting access requests and data, such as data to be programmed to one or more of memory dies 112*a*-*n*, to NVM package 104. Communication over communications path 116 can be received at external interface 110 of memory controller 106. According to some embodiments, external interface 110 may be separate from, and communicatively connected to, memory controller 106.

According to some embodiments, communications path 116 can include more than one external communications channel between host 102 and external interfaces (e.g., external interface 110) of memory controller 106. Each external communications channel may provide point-to-point communication between host 102 and one or more memory dies 112*a*-*n* through memory controller 106. For example, host controller 114 may control a switch (e.g., a multiplexer ("MUX")) that can toggle between a number of channels extending from host 102 to NVM package 104. Each channel may, in turn, communicate with one or more memory dies 112*a*-*n*.

Like host controller 114, memory controller 106 can include one or more processors and/or microprocessors 120 that are configured to perform operations based on the execution of software and/or firmware instructions. Additionally and/or alternatively, memory controller 106 can include hardware-based components, such as ASICs, that are configured to perform various operations. Memory controller 106 can perform a variety of operations, such as executing access requests initiated by host 102.

Host controller 114 and memory controller 106, alone or in combination, can perform various memory management functions, such as wear leveling and garbage collection. In implementations in which memory controller 106 is configured to perform at least some memory management functions, NVM package 104 can be termed "managed NVM" (or "managed NAND" for NAND flash memory). This can be in contrast to "raw NVM" (or "raw NAND" for NAND flash memory), in which host controller 114, external to NVM package 104, performs memory management functions for NVM package 104.

In some embodiments, as in the embodiments depicted in FIG. 1, memory controller 106 can be incorporated into the same package as memory dies 112*a*-*n*. However, memory controller 106 may be physically located in a separate package or in the same package as host 102. In some embodiments, such as in the case of raw NVM, for example, memory controller 106 may be omitted, and all memory management functions normally performed by memory controller 106 (e.g., garbage collection and wear leveling) can be performed by a host controller host controller 114).

Memory controller 106 may also include volatile memory 122 and NVM 124. Volatile memory 122 can be any of a variety of volatile memory types, such as cache memory or RAM. Memory controller 106 can use volatile memory 122 to perform memory operations and/or to temporarily store data that is being read from and/or programmed to one or more NVMs in memory dies 112*a*-*n*. For example, volatile memory 122 can store firmware and memory controller 106 can use the firmware to perform operations on NVM package 104 (e.g., access requests and/or memory management functions).

Memory controller 106 can use NVM 124 to persistently store a variety of information, such as debug logs, instructions, and firmware that NVM package 104 uses to operate. NVM 124 can be any of a variety of NVM (e.g., NAND flash memory or NOR flash memory). In some embodiments, NVM 124 locally and persistently stores firmware for NVM package 104.

Memory controller 106 can use communications path 126 to access one or more NVMs used for persistent data storage. In system 100, the one or more NVMs are depicted as NVMs 128*a*-*n*, which are incorporated into memory dies 112*a*-*n*. Memory dies 112*a*-*n* can be, for example, IC dies. Analogous to communications path 116, communications path 126 can include more than one internal communications channel. A controller (e.g., memory controller 106) can toggle between available internal communications channels of communications path 126 using a switch (e.g., a multiplexer). Alternatively, according to some embodiments, internal communications channels of communications path 126 can be internal busses that couple each internal communications channel to one or more of memory dies 112*a*-*n*. Systems having multiple internal communications channels are described in more detail in connection with FIGS. 3-7.

Memory dies 112*a*-*n* can be physically arranged in a variety of configurations, including a stacked configuration. NVMs 128*a*-*n* can be any of a variety of NVM, such as NAND flash memory based on floating gate or charge trapping technology, NOR flash memory, erasable programmable read only memory ("EPROM"), electrically erasable programmable read only memory ("EEPROM"), ferroelectric RAM ("FRAM"), magnetoresistive RAM ("MRAM"), phase change memory ("PCM"), or any combination thereof.

Shared busses can typically suffer from signal integrity issues as the total number of system components increases. Accordingly, to improve signal integrity, the system can enable point-to-point communication between a host and one or more memory dies. Point-to-point communication can be achieved through the use of switches (e.g., multiplexers) included at various points throughout the system. For example, the host device may include a switch for toggling between a number of memory controller interfaces. Memory controllers included in the system may also include switches for accessing a number of memory dies. In general, point-to-point communication, as described herein, can increase bandwidth and decrease latency in a nonvolatile memory system.

Figure 2:
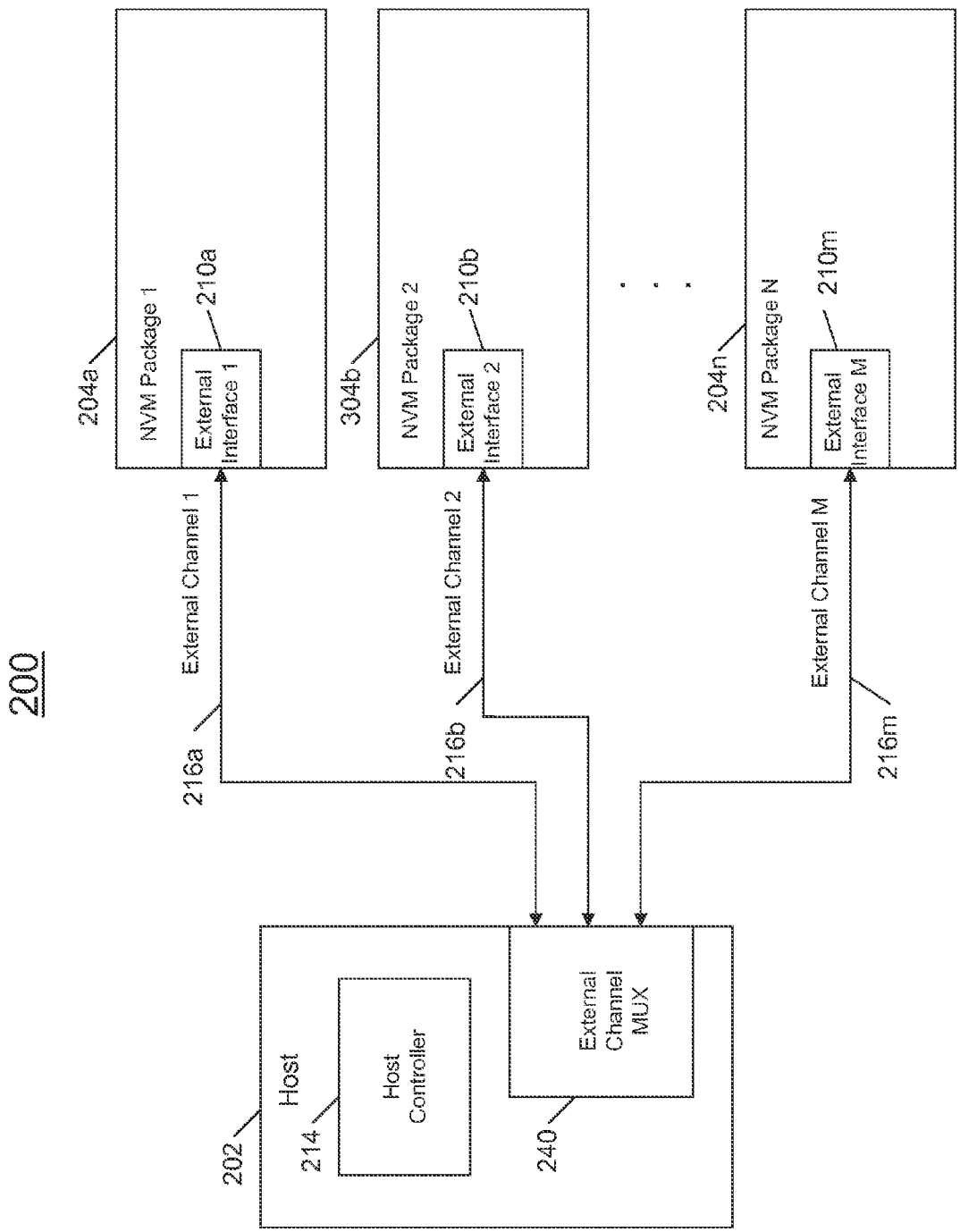
FIG. 2 is a diagram depicting an illustrative system in accordance with some embodiments of the invention.

FIG. 2 is a diagram depicting device 200, including host 202 and NVM packages 204a-n in accordance with some embodiments. Host 202 can include host controller 214 and external channel MUX 240. External channel MUX 240 can be any suitable mechanism for toggling between a number of channels (e.g., external communications channels 216a-m) extending from host 202 to NVM packages 204a-n. For example, external channel MUX 240 can be a multiplexer/de-multiplexer that can send outgoing signals over a selected one of external communications channels 216a-m. In addition, external channel MUX 240 can select one of external communications channels 216a-m to receive incoming signals from NVM packages 204a-n.

The total number of external communications channels 216a-m may be optimized for the particular system configuration. For example, according to some embodiments, more than one external communications channel can extend from host 202 to the external interfaces in each of NVM packages 204a-n. The total number of external communications channels 216a-m may depend on, for example, the speed of host 202 and/or external interfaces 210a-m. In general, as the speed of host 202 and external interfaces 210a-m increase, the number of external communications channels 216a-m that device 200 can accommodate also increases. Additionally, a larger number of external communications channels 216a-m can enable more direct access to the one or more NVMs in NVM packages 204a-n.

Figure 3:
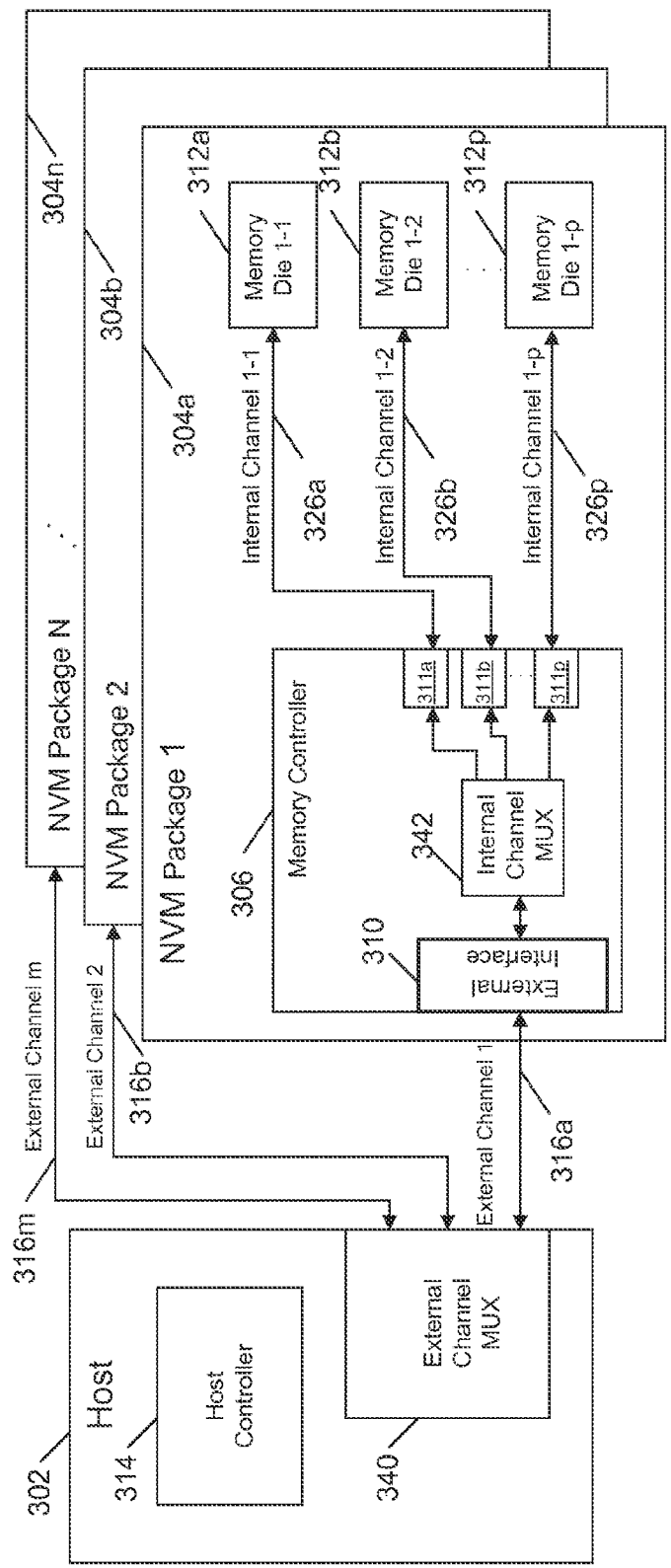
FIG. 3 is a diagram depicting an illustrative system in accordance with some embodiments of the invention.

FIG. 3 is a diagram depicting device 300, including host 302 and NVM packages 304a-n in accordance with some embodiments. Host 302 can include host controller 314 and external channel MUX 340. External channel MUX 340 may correspond to, for example, external channel MUK 340 of FIG. 3. External communications channels 316a-m can extend from host 302 to external interfaces (e.g., external interface 310) in NVM packages 304a-n. According to some embodiments, more than one external communications channel can extend from host 302 to each of NVM packages 304a-n. Each external communications channel 316a-m may communicate with a memory controller (e.g., memory controller 306) through external interfaces (e.g., external interface 310) included in NVM packages 304a-n.

Memory controller 306 can correspond to, for example, memory controller 106 of FIG. 1 and can be responsible for carrying out memory management functions (e.g., wear leveling and garbage collection, etc.) and access requests (e.g., read, program, and erase operations). To carry out these operations, memory controller 306 may include one or more processors as well, as volatile and/or nonvolatile memory (not shown for clarity). Memory controller 306 can also include internal channel MUX 342, which may be similar to external channel MUX 340. In particular, internal channel MUX 342 can be used to switch between one or more internal communications channels 326a-p, which extend from internal interfaces 311a-p of memory controller 306 to memory dies 312a-p.

Figure 4:
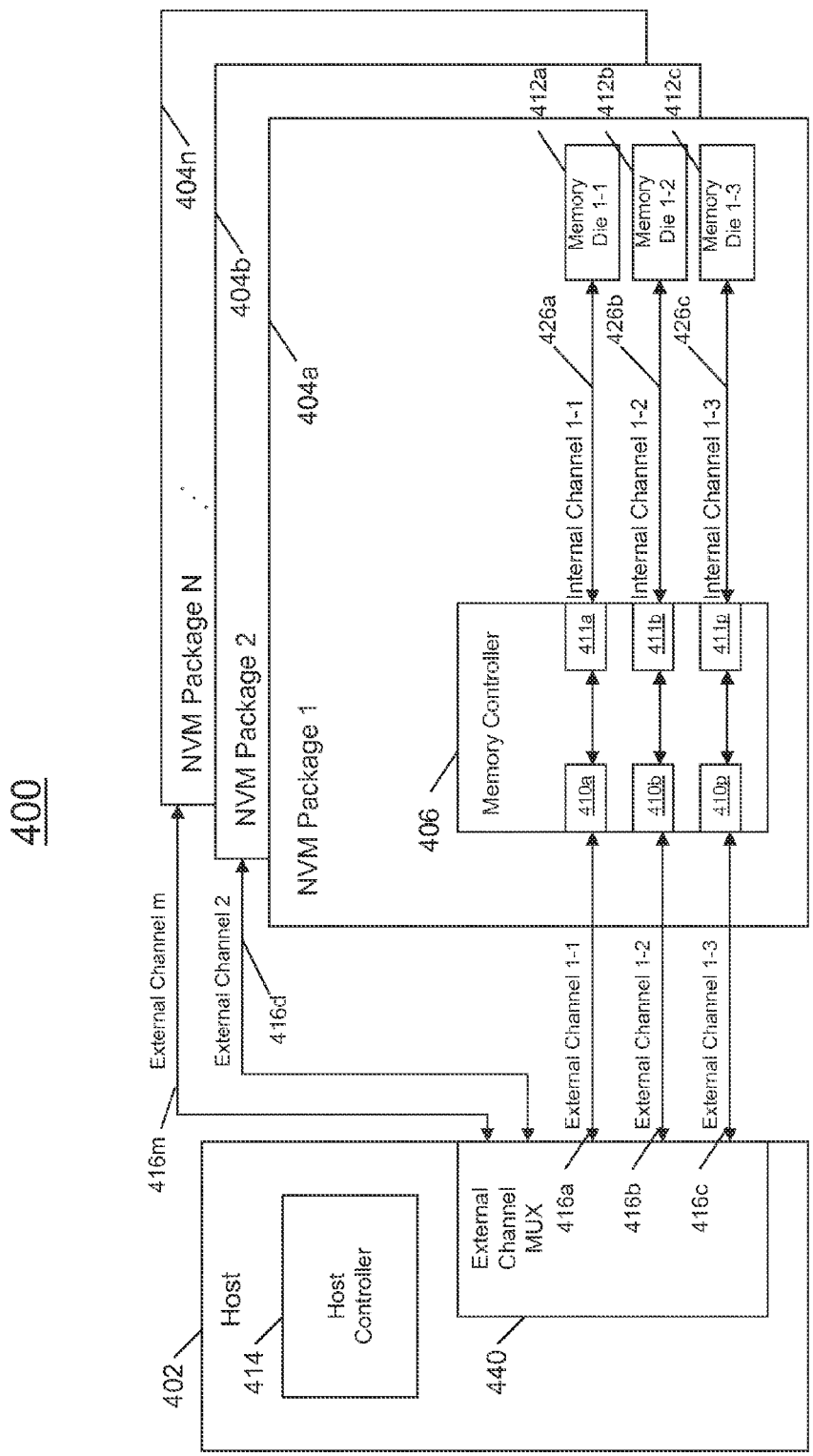
FIG. 4 is a diagram depicting an illustrative system in accordance with some embodiments of the invention.

According to some embodiments, memory controller 306 can adjust the number of active external communications channels 316a-m used in NVM package 304a based on the total number of available external communications channels 316a-m. For example, memory controller 306 may activate a number of external interfaces 310 (and, thereby external communications channels) less than the number of memory dies 312a-p and use internal channel MUX 342 to activate a number of internal interfaces (thereby switching between internal communications channels 326a-p to access memory dies 312a-p). Alternatively, memory controller 306 may activate a number of external interfaces equal to the number of internal communications channels 326a-p in NVM package 304a (as depicted in FIG. 4 below). In these embodiments, memory controller 306 can associate each external communications channel 316a-m with a corresponding internal communications channel 326a-p to transmit data directly between memory dies 312a-p and host 302.

According to some embodiments, memory controller 306 can further optimize the number of active external communications channels 316a-m based on the speed of memory controller 306 and host 302 (e.g., processors and interfaces included in memory controller 306 and host 302). For example, internal channel MUX 342 may not be capable of toggling among all internal communications channels 326a-p to access each memory dies 312a-p. As a result, memory controller 306 may increase the number of external communications channels 316a-m communicating with NVM package 304a to reduce the burden on internal channel MUX 342. In some embodiments, more than one internal communications channel MUX may be included in memory controller 306, each of which can be coupled to an incoming external communications channel.

The particular configuration depicted in device 300 may be advantageous for embodiments in which host 302 and memory controller 306 are both fast devices that are capable of toggling between multiple channels. For example, host 302 can toggle between external communications channels 316a-m and memory controller 306 can toggle between internal communications channels 326a-p. Although not shown, persons skilled in the art will appreciate that corresponding memory controllers in NVM packages 304b-n can also toggle between multiple memory dies. Generally, however, the total number of external communications channels 316a-m extending from host 302 to each NVM package 304a-n can be optimized based on factors such as, for example, the relative speed of host 302 and the memory controllers, the speed of external and internal interfaces, the total number of NVM packages 304a-n, and the total number of memory dies in each NVM package 304a-n, and any combination thereof.

In some embodiments, memory controllers (e.g., memory controller 306) in different NVM packages 304a-n can communicate with each other to determine the optimal arrangement for the entire device. Each memory controller may adjust the number of active external interfaces that an associated NVM package uses. As a result, available external communications channels 316a-m can be spread evenly among NVM packages 304a-n. Alternatively, the memory controllers can monitor the total traffic between host 302 and NVM packages 304a-n and allocate more external communications channels 316a-n to NVM packages with more traffic. Adjustment of the number of active external interfaces in each NVM package 304a-n can be completed during power on of device 300 and/or performed dynamically while device 300 is operating.

FIG. 4 is a diagram depicting device 400, including host 402 and NVM packages 404a-n in accordance with some embodiments. Host 402 can include host controller 414 and external channel MUX 440. External communications channels 416a-m can extend from host 402 to NVM packages 404a-n. As shown, multiple external communications channels (e.g., external, communications channels 416a-c) can extend from host 402 to each of NVM packages 404a-n. Although only three external communications channels are depicted extending from host 402 to NVM package 404a, persons skilled in the art will recognize that any suitable number of external communications channels can extend from a host to external interfaces of an NVM package (e.g., external interfaces 410a-p of NVM package 404a).

In these embodiments, external channel MUX 440 can switch between external communications channels 416a-m and pass through a memory controller from an external interface to an internal interface (e.g., external interface 410a to internal interface 411a of memory controller 406) to achieve a point-to-point connection to one of the memory dies (e.g., one of memory dies 412a-c in NVM package 404a or one of the memory dies in NVM packages 404b-n) in device 400. The configuration shown in device 400 may be useful, for example, if host 402 is a fast device and memory controller 406 is a slow device. That is, host 402 may be capable of accommodating enough external communications channels 416a-m to achieve a point-to-point connection to each memory die in device 400. In these embodiments, the memory controllers in NVM packages 404a-n do not have to be capable of toggling between multiple internal communications channels because all switching is accomplished using external channel MUX 440. According to some embodiments, however, each internal communications channel (e.g., internal communications channels 526a-c) can represent an internal bus that includes branches for connecting a single internal communications channel to more than one memory die.

Figure 5:
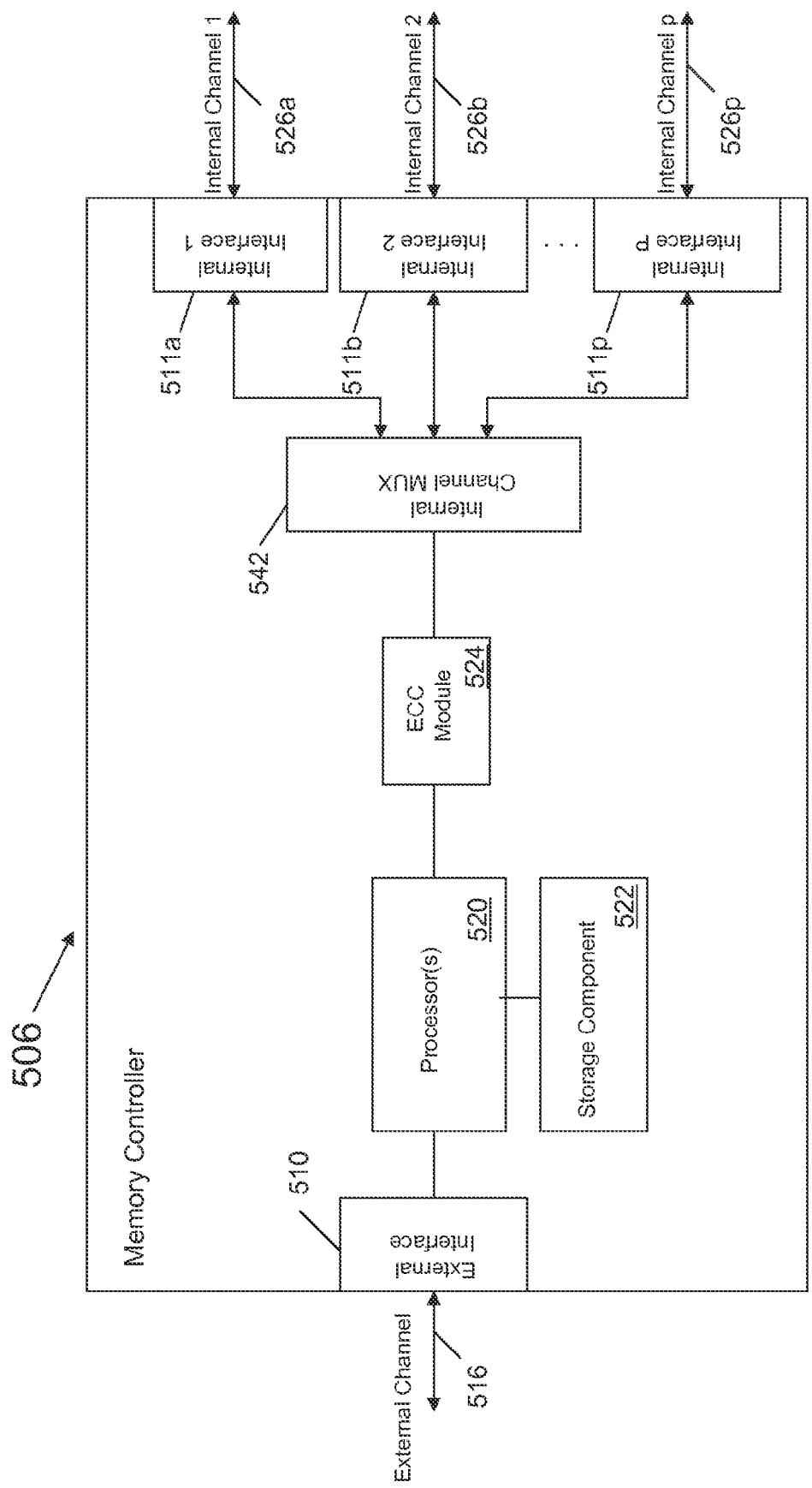
FIG. 5 is a diagram depicting an illustrative memory controller in accordance with some embodiments of the invention.

FIG. 5 is a diagram of a more detailed view of memory controller 506 in accordance with some embodiments. Memory controller 506 may be the same as or similar to, for example, memory controller 306 of FIG. 3. In particular, memory controller 506 can include external interface 510, Error Correction Code ("ECC") module 524, processor (s) 520, storage component. 522, which may include both volatile and nonvolatile memory, internal channel MUX 542, and internal interfaces 511a-p. Although only one external interface 510 is shown, persons skilled in the art will appreciate that memory controller 506 may include more than one external interface 510. Each external interface 510 can couple memory controller 506 to an external communications channel (e.g., external communications channel 516), which can provide a communications path between memory controller 506 and a host device (e.g., host 302 of FIG. 3).

External interface 510 can be coupled to processor(s) 520, which can carry out access requests received from a host device and perform memory management functions. ECC module 524 can provide error correction for NVM coupled to memory controller 506 through internal interfaces 511a-p and internal communications channels 526a-p. Memory controller 506 may also include internal channel MUX 542, which can toggle between multiple internal interfaces 511a-p. According to some embodiments, all elements of memory controller 506 can be fabricated in bare die form on a single IC. Alternatively, one or more components of memory controller 506 can be fabricated separately and communicatively coupled to the other memory controller components.

Internal channel MUX 542 can be any component suitable to route one external communications channel (e.g., external, communications channel 516) to one of several internal communications channels. For example, internal channel MUX 542 can be a multiplexer/de-multiplexer. Functioning as a de-multiplexer, internal channel MUX 542 can route outgoing signals over a selected one of internal interfaces 511a-p and internal communications channels 526a-p. Functioning as a multiplexer, internal channel. MUX 542 can select one of internal interlaces 511a-p to receive incoming signals from one or more NVMs over internal communications channels 526a-p. According to some embodiments, each one of internal communications channels 526a-p can couple memory controller 506 to a single NVM memory die (e.g., one of memory dies 312a-p of FIG. 3) to provide direct point-to-point connection between a host device and each memory die in a system. In other embodiments, each internal communications channel 526a-p may be an internal bus that can communicate with more than one memory die.

Figure 6:
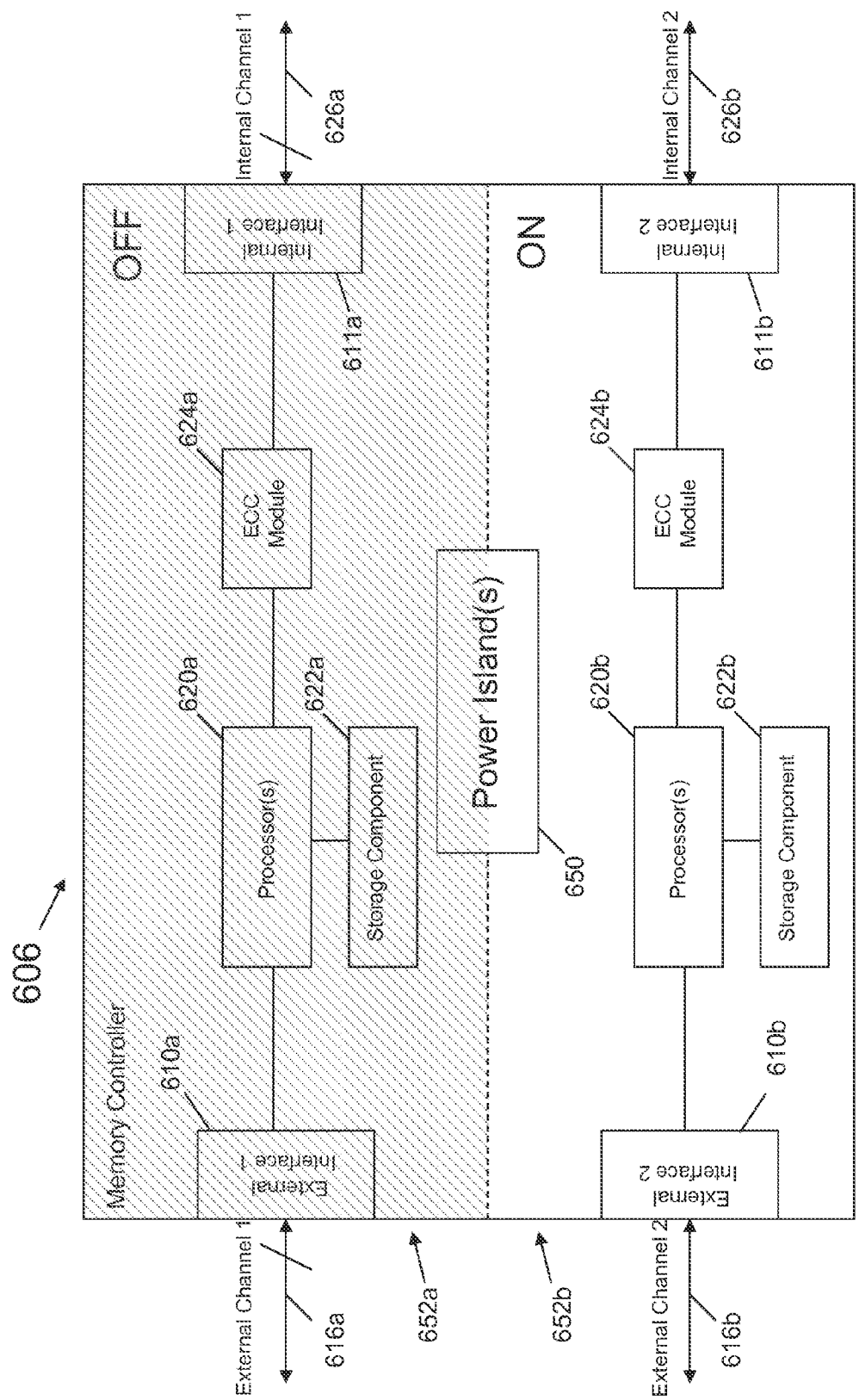
FIG. 6 is a diagram depicting an illustrative memory controller in accordance with some embodiments of the invention.

FIG. 6 is a diagram of memory controller 606 in accordance with some embodiments. Memory controller 606 can include external interfaces 610a-b, which can allow memory controller 606 to communicate with a host device over external communications channels 616a-b, ECC module 624a-b, processor (s) 620a-b, storage components 622a-b, and internal interfaces 611a-b, which can allow memory controller 606 to communicate with memory dies over internal communications channels 726a-b. As shown in FIG. 6, components in memory controller 606 can be grouped into component groups 652a-b, which may be associated with external channels 616a and 616b, respectively. Although only two component groups 652a-b are shown in FIG. 6, one skilled in the art can appreciate that memory controller 606 can include any number of memory controller channels. According to some embodiments, memory controller 606 may also include one or more memory channel MUXs (e.g., internal channel MUX 542 of FIG. 5) as described in more detail below in connection with FIG. 7.

Additionally, memory controller 606 can include power island (s) 650, which can electrically isolate component groups 652a and 652b from one another. In particular, power island (s) 650 can shut off all components in a memory controller channel that are no associated with an active external communications channel. For example, as depicted in FIG. 6, component group 652a is turned off, and component group 652b is turned on, indicating that external communications channel 616b is currently active. Thus, in some embodiments, external channel 616b may function as the main channel, while external channel 616a may function as the auxiliary channel. Power island (s) 650 can advantageously save power and simplify communications in memory systems that include point-to-point communication by powering down all memory controller components that are not being used for the instant memory operation (e.g., an access request or memory management function).

According to some embodiments, a host device can communicate with a memory package over a traditional bus. In these embodiments, external channels 616a-b can represent two branches of the same external channel. In general, an external channel can be split into any suitable number of branches. In addition, any suitable number of NVM packages with any number of external interfaces can be included in a memory device. Each external interface may be associated with a memory controller channel (e.g., memory controller channel 652a or 652b) and one or more power island(s) 650. In these embodiments, all inactive external interfaces can be configured to electrically isolate one or more memory controller channels. This configuration can enable point-to-point communication between a host device and a memory die over one particular active branch of a shared bus.

Figure 7:
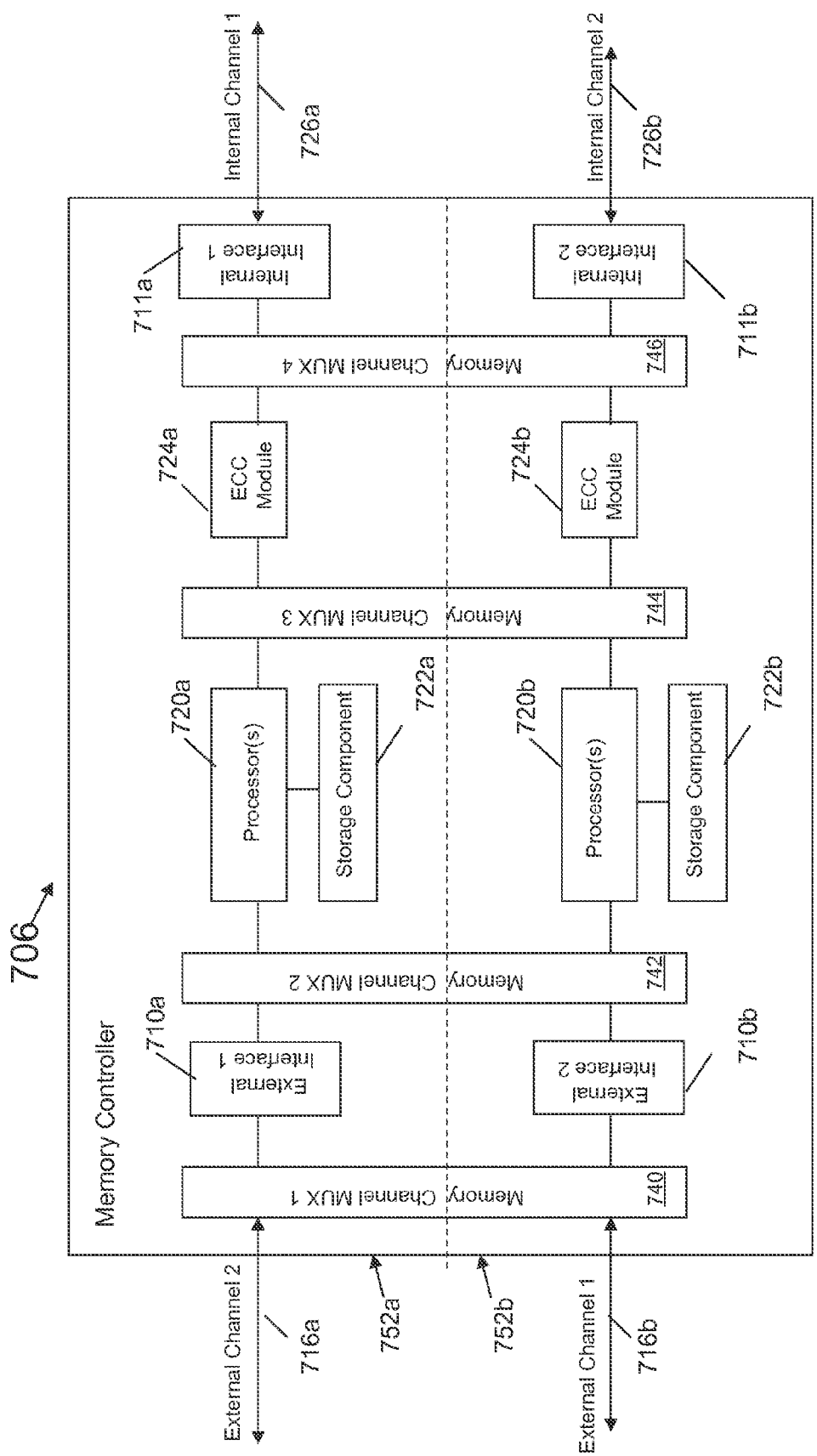
FIG. 7 is a diagram depicting an illustrative memory controller in accordance with some embodiments of the invention.

FIG. 7 is a diagram of memory controller 706 in accordance with some embodiments. Memory controller 706 can include external interfaces 710a-b, ECC modules 724a-b, processor (s) 720a-b, storage components 722a-b, and internal interfaces 811a-b. Components in memory controller 706 can generally be grouped into main channel 752a and auxiliary channel 752b.

Memory controller 706 can also include memory channel. MUXs 740, 742, 744, and 746, which can provide a number of possible routing paths through memory controller 706 for communication between a host and NVM dies using external channels 716*a*-*b* and internal channels 726*a*-*b*. Alternative routing paths can add flexibility to a memory system incorporating memory controller 706 by allowing memory controller 706 to deactivate one or more memory controller components while maintaining point-to-point communication between a host and NVM dies. This added flexibility can help to alleviate traffic congestion in a nonvolatile memory system by optimizing the routing signals through the system, which can increase bandwidth, decrease latency, and enhance signal integrity.

For example, memory controller 706 can deactivate external interface 710*a*, such that external interface 710*b* handles all communications with a connected host device. Signals received through external interface 710*b* can then be processed in processor(s) 720*a* or processor(s) 720*b* based on a selection made by memory channel MUX 742. Similarly, either ECU module 724*a* or 724*b* can be used to perform error correction on NVM dies coupled to memory controller 706 based on a selection made by memory channel MUX 744. Finally, point-to-point communication to any NVM die coupled to internal channels 726*a* and 726*b* can be achieved based on a selection made by memory channel MUX 746. Although only two channels are shown in FIG. 7, a person skilled in the art will appreciate that any number of channels can be included in memory controller 706.

Figure 8:
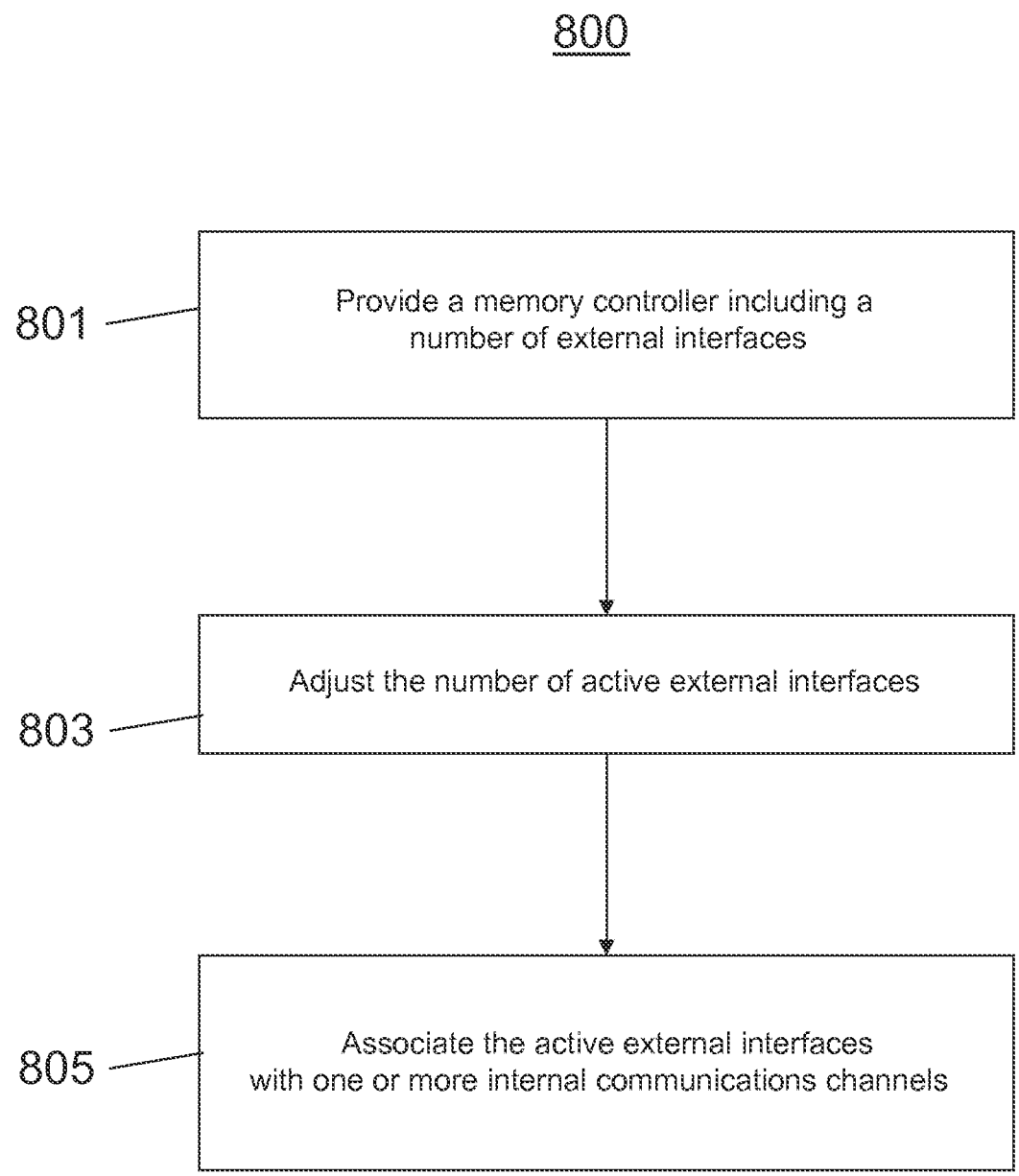
FIG. 8 is a flow chart of an illustrative process in accordance with some embodiments of the invention.

FIG. 8 is a flowchart of illustrative process 800 for improved communications in a nonvolatile memory system. In step 801, a memory controller with a number of external interfaces, can be provided. The memory controller can be for example, memory controller 506 of FIG. 5. The external interfaces can be coupled to external communications channels extending from a host device to the memory controller.

In step 803, the memory controller can adjust the number of active external interfaces. The adjustment may be based on any suitable factors including, for example, the relative speeds of processors included in the host device and the memory controller, the speed of the external interfaces, and/or the total number of available external communications channels.

In step 805, the memory controller can associate the active external interfaces with one or more internal communications channels that are, in turn, coupled to NVM dies. For example, the memory controller may, according to some embodiments, activate a number external interfaces and pair each external interface with a single internal communications channel, thereby providing point-to-point communication between a host and NVM dies coupled to the internal communications channels. In other embodiments, a single external interface can be coupled to multiple internal communications channels, and an internal channel MUX can be used to switch between the internal communications channels, resulting in point-to-point communication between a host and NVM dies coupled to the internal communications channels.

A memory system capable of implementing process 800 can generally include any number of NVM packages (e.g., a memory controller and NVM dies). Each NVM package can be coupled to a host device via one or more external communications channels. A controller incorporated into the host can toggle between the one or more external communications channels. Memory controllers in the system may communicate with each other to determine the optimal configuration for the memory system based on factors such as, for example, the total number of available external communications channels, the relative speed of the host and the memory controllers, and/or the speed of the external interfaces.

It is to be understood that the steps shown in process 800 are merely illustrative and that existing steps may be modified or omitted, additional steps may be added, and the order of certain steps may be altered.

While there have been described systems and methods for enabling point-to-point communications between elements of a nonvolatile memory system, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A memory controller comprising:
   a plurality of internal interfaces, wherein each of the plurality of internal interfaces is configured to communicate with a respective one of a plurality of memories;
   a plurality of external interfaces, wherein each of the plurality of external interfaces is configured to communicate with a respective one of a plurality of external communications channels; and
   a processor coupled to the plurality of internal interfaces and to the plurality of external interfaces, wherein the processor is further configured to:
      associate a given internal interface of the plurality of internal interfaces with a given external interface of the plurality of external interfaces;
      enable a transfer of data between the given external interface and the given internal interface;
      turn power off to at least an associated pair of another external interface and an associated internal interface, wherein the another external interface of the associated pair is coupled to an inactive external communications channel of the plurality of external communications channels.

2. The memory controller of claim 1, wherein the processor is further configured to associate two or more internal interfaces of the plurality of internal interfaces with the given external interface of the plurality of external interfaces.

3. The memory controller of claim 2, further comprising a multiplexer coupled to the given external interface of the plurality of external interfaces, wherein the multiplexer is configured to select from the two or more internal interfaces of the plurality of internal interfaces.

4. The memory controller of claim 1, wherein the processor is configured to:
   select a first number of the plurality of external interfaces; and
   activate a second number of the plurality of internal interfaces dependent upon the selected first number of the plurality of external interfaces;
   wherein the second number is greater than or equal to the first number.

5. The memory controller of claim 4, wherein to select the first number of the plurality of external interfaces, the processor is further configured to select the first number of the plurality of external interfaces dependent upon a number of available external communications channels of the plurality of external communications channels.

6. The memory controller of claim 4, wherein to select the first number of the plurality of external interfaces, the processor is further configured to select the first number of the plurality of external interfaces dependent upon a speed of at least one of a number of available external communications channels of the plurality of external communications channels.

7. The memory controller of claim 3, wherein to turn power off to at least an associated pair of an internal interface and an external interface, the processor is further configured to use the multiplexer to couple the given external interface to the given internal interface.

8. A method comprising:
associating, by a memory controller, a given external interface of a plurality of external interfaces to a respective internal interface of a plurality of internal interfaces;
transferring data between the given external interface of the plurality of external interfaces and the respective internal interface of the plurality of internal interfaces, wherein the given external interface of the plurality of external interfaces is coupled to a respective external communications channel of a plurality of external communications channels, and wherein the respective internal interface of the plurality of internal interfaces is coupled to a memory; and
turning power off to at least an associated pair of another external interface and an associated internal interface, wherein the another external interface of the associated pair is coupled to an inactive external communications channel of the plurality of external communications channels.

9. The method of claim 8, wherein associating the given external interface of the number of external interfaces to the respective internal interface of the plurality of internal interfaces further comprises associating two or more internal interfaces of the plurality of internal interfaces with the given external interface.

10. The method of claim 9, wherein turning power off to the at least an associated pair of the another external interface and the associated internal interface further comprises using one or more multiplexing circuits to couple the given external interface to the respective internal interface.

11. The method of claim 8, further comprising:
selecting a first number of external interfaces of the plurality of external interfaces; and
associating a second number of internal interfaces of the plurality of internal interfaces dependent upon the selected first number of external interfaces;
wherein the second number is greater than or equal to the first number.

12. The method of claim 11, wherein selecting the first number of external interfaces of the plurality of external interfaces comprises selecting the first number of external interfaces dependent upon a number of available external communications channels of the plurality of external communications channels.

13. The method of claim 11, further comprising comparing a speed of at least one of the selected first number of external interfaces with a speed of a given one of the plurality of external communications channels.

14. The method of claim 13, wherein selecting the first number of external interfaces of the plurality of external interfaces comprises selecting the first number of external interfaces dependent upon the comparison of the speed of the at least one of the selected first number of external interfaces with the speed of the given one of the plurality of external communications channels.

15. A system, comprising:
a plurality of memories;
a plurality of internal communication channels, wherein each internal communication channel of the plurality of internal communication channels is coupled to a respective one of the plurality of memories;
a plurality of external communication channels coupled to a host; and
a memory controller configured to:
associate a given external communication channel of the plurality of external communication channels to a given internal communication channel of the plurality of internal communication channels;
enable an exchange of data between the given external communication channel and the given internal communication channel; and
turn power off to a portion of internal circuitry, wherein the portion of internal circuitry is coupled to an inactive external communications channel of the plurality of external communications channels.

16. The system of claim 15, wherein the memory controller is further configured to associate two or more internal communication channels of the plurality of internal communication channels with the given external communication channel of the plurality of external communication channels.

17. The system of claim 16, wherein the memory controller further includes a multiplexer coupled to the given external communication channel of the plurality of external communication channels, and wherein the multiplexer is configured to select from the two or more associated internal communication channels of the plurality of internal communication channels.

18. The system of claim 15, wherein the memory controller is further configured to:
select a first number of external communication channels of the plurality of external communication channels; and
associate a second number of internal communication channels of the plurality of internal communication channels dependent upon the selected first number of external communication channels;
wherein the second number is greater than or equal to the first number.

19. The system of claim 18, wherein to select the first number of external communication channels, the memory controller is further configured to select the first number of external communication channels dependent upon a number of available external communication channels of the plurality of external communication channels.

20. The system of claim 18, wherein to select the first number of external communication channels, the memory controller is further configured to select the first number of external communication channels dependent upon a speed of at least one of the plurality of external communications channels.

* * * * *